United States Patent

Gugel et al.

(10) Patent No.: US 8,718,414 B2
(45) Date of Patent: May 6, 2014

(54) ACOUSTO-OPTICAL TUNABLE FILTER ELEMENT

(75) Inventors: Hilmar Gugel, Dossenheim (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 258 days.

(21) Appl. No.: 13/366,670

(22) Filed: Feb. 6, 2012

(65) Prior Publication Data

US 2012/0134007 A1    May 31, 2012

Related U.S. Application Data

(60) Division of application No. 12/622,719, filed on Nov. 20, 2009, now abandoned, which is a continuation of application No. PCT/EP2008/055355, filed on Apr. 30, 2008.

(30) Foreign Application Priority Data

May 22, 2007    (DE) .......................... 10 2007 024 075

(51) Int. Cl.
*G02F 1/335*    (2006.01)
*G02F 1/11*    (2006.01)

(52) U.S. Cl.
USPC ................... 385/7; 385/31; 385/33; 359/287; 359/305; 359/312

(58) Field of Classification Search
USPC ................. 359/285–287, 305, 308, 312–314; 385/7, 31, 33
See application file for complete search history.

(56) References Cited

U.S. PATENT DOCUMENTS

| | | | |
|---|---|---|---|
| 4,084,182 A | 4/1978 | Maiman | |
| 5,146,358 A * | 9/1992 | Brooks | .......................... 359/305 |
| 5,216,484 A | 6/1993 | Chao et al. | |
| 5,377,003 A | 12/1994 | Lewis et al. | |
| 5,687,020 A | 11/1997 | Park et al. | |
| 5,841,577 A | 11/1998 | Wachman et al. | |
| 6,850,358 B2 | 2/2005 | Birk et al. | |
| 7,009,763 B1 | 3/2006 | Wolleschensky | |
| 2009/0086315 A1 | 4/2009 | Birk et al. | |

FOREIGN PATENT DOCUMENTS

| | | |
|---|---|---|
| DE | 697 14 021 T4 | 8/1997 |
| DE | 101 15 488 A1 | 12/2001 |
| DE | 101 15 509 A1 | 12/2001 |
| DE | 101 15 589 A1 | 12/2001 |
| EP | 0 762 143 A1 | 3/1997 |
| EP | 1 141 763 B1 | 10/2001 |

(Continued)

*Primary Examiner* — Evelyn A. Lester
(74) *Attorney, Agent, or Firm* — Foley & Lardner LLP (57) ABSTRACT

An acousto-optical filter element (114) is provided which has an acousto-optical crystal (118) having an acoustic signal transmitter (120) for generating acoustic signals in the acousto-optical crystal (118). The acousto-optical crystal (118) is designed to selectively spatially deflect light of a target wavelength from an input light beam (116) entering into the acousto-optical crystal (118), as a function of a high frequency applied to the acoustic signal transmitter (120), and to thereby produce a target light beam (126) having the target wavelength. In addition, the acousto-optical filter element (114) includes a spatial filter element (132) which is located in the target light beam (126) and is designed to selectively suppress the intensity of the target light beam (126) in a plane perpendicular to the propagation direction of the target light beam (126).

4 Claims, 6 Drawing Sheets

(56) References Cited

FOREIGN PATENT DOCUMENTS

| EP | 1 281 997 A2 | 2/2003 |
| EP | 1 467 235 A1 | 10/2004 |
| JP | 2003-65850 A | 3/2003 |
| WO | WO 97/30371 A1 | 8/1997 |
| WO | WO 00/43753 A1 | 7/2000 |
| WO | WO 2005/001401 A2 | 1/2005 |

\* cited by examiner

ACOUSTO-OPTICAL TUNABLE FILTER ELEMENT

CROSS-REFERENCE TO RELATED PATENT APPLICATIONS

This application is a Divisional of application Ser. No. 12/622,719, filed Nov. 20, 2001, now pending, which is a Continuation of International Application No. PCT/EP2008/055355, filed Apr. 30, 2008, which is based upon and claims the benefit of priority from prior German Patent Application No. 10 2007 024 075.0, filed May 22, 2007, the entire contents of all of which are incorporated herein by reference in their entirety.

FIELD OF THE INVENTION

The present invention relates to an acousto-optical filter element according to the definition of the species set forth in claim 1. The present invention also relates to an adjustable light source which includes an acousto-optical filter element in accordance with the present invention, as well as to a microscope for capturing image information from a specimen that includes an adjustable light source in accordance with the present invention. Moreover, the present invention relates to an acousto-optical beam splitter which includes an acousto-optical filter element in accordance with the present invention.

BACKGROUND OF THE INVENTION

From the natural sciences, engineering and medicine, microscopes for capturing image information from different types of specimen are known in numerous technical variants. To an increasing degree, coherent light sources, which include one or a plurality of lasers, for example, are being used as light sources for producing excitation beams. In particular, laser microscopes can be designed as scanning microscopes.

Scanning microscopes are known in diverse variants that differ, for example, in the type and generation of the microscope beam. Thus, for example, electromagnetic beams can be used in the optical, infrared or ultraviolet region of the spectrum. Other distinctions among the various types of scanning microscopes are evident in the interaction of the microscope beam(s) with the specimen to be examined. In the following description, reference is made first and foremost to fluorescence microscopes, where the microscope beam, respectively excitation beam excites the fluorescence of a specimen that can then be captured and used for image acquisition. Apart from that, there are numerous other measuring principles, however, such as those based on spectroscopic laser methods, those based on particle emissions, or other measuring principles. The present invention described in the following can be applied, in principle, to all such methods and designs, as well as to other microscopes whose functioning is not based on the scanning principle.

Supplying excitation light having one or a plurality of predefined wavelengths presents a significant challenge to numerous known microscopes, regardless of the method used. In this context, depending on the type of microscopy method and/or the type of specimen (for example, the specimen quality or the particular dye used to stain the specimen), one or a plurality of excitation light beams are needed, which typically must have predefined spectral properties.

When working with conventional laser microscopes, the excitation light is supplied by one or a plurality of excitation lasers; typically, however, merely a limited wavelength region, respectively a limited selection of spectral lines being available. As a result, the microscopes are limited in their application to certain specimen types, specific microscopy methods, and/or to specific dyes used in staining the specimen. In many cases, this limited application spectrum is not satisfactory.

For that reason, microscopes are known which are able to utilize coherent white light sources as a light source. These microscopes also use broadband coherent light sources, similarly to conventional microscopes having non-coherent light sources that generate incoherent light having a broad wavelength distribution, from which the requisite spectral regions are then selected using wavelength-selective elements. These types of light sources, which have a broad wavelength spectrum, are also commonly referred to as "white light sources."

Light sources, whose light has a broad wavelength spectrum, can be realized by the incoupling of laser radiation, particularly with the aid of special optical elements, such as a tapered (i.e., structured, particularly in terms of its index of refraction) fiber, a microstructured fiber (in particular, a photonic crystal fiber, PCF), a holey fiber, a photonic bandgap fiber (PBC) or a specially doped fiber (for example, a fiber having a rare-earth-metal or semiconductor doping), for example. These types of white-light lasers are often referred to as supercontinuum white-light lasers. Examples of such broadband white-light lasers are given in the German Patent Applications DE 101 15 488 A1, DE 101 15 509 A1 or DE 101 15 589 A1. The present invention described in the following is based on these white-light lasers, but is also well suited for use with other coherent broadband light sources.

From the broadband coherent light produced by the white-light lasers or broadband light sources, a specific wavelength or a specific spectral region can be subsequently selected with the aid of wavelength-selective elements. Various wavelength-selective elements of this kind, such as prisms or gratings, have been known for quite some time.

In recent years, however, wavelength-selective elements that are based on the acousto-optical effect (acousto-optical elements) are being used to an increasing degree. These types of acousto-optical elements typically have what is generally known as an acousto-optical crystal (for example, a tellurium dioxide crystal, $TeO_2$), which is cut in a suitable crystal direction. Mounted on this acousto-optical crystal are one or a plurality of acoustic signal transmitters, which are also referred to as "transducers." A transducer of this kind typically has a piezoelectric material, as well as two or more electrodes contacting this material. By applying radio frequencies, typically within the range of between 30 MHz and 800 MHz, to the electrodes, the piezoelectric material is excited to oscillate, thereby enabling an acoustic wave to be produced that propagates through the crystal. After propagating through an optical interaction region, this acoustic wave is mostly absorbed or reflected at the opposite crystal side. A distinguishing feature of acousto-optical crystals is that the sound wave produced alters the optical properties of the crystal, an optical grating or a comparable optically active structure (hologram) being induced by the sound. Light passing through the crystal can ultimately undergo diffraction at this optical grating and be deflected into different diffraction orders or diffraction directions.

In the case of acousto-optical components, one distinguishes between those components which influence the entire incident light to a greater or lesser degree independently of the wavelength (for example, acousto-optical modulators) and those components which act selectively on individual wavelengths (for example, as a function of the radio frequency irradiation) (acousto-optical tunable filters, AOTF). In many cases, the acousto-optical elements have double-refractive crystals, such as the mentioned tellurium dioxide, for example, the position of the crystal axis relative to the plane of incidence of the light and the polarization thereof determining the optical properties of the acousto-optical element.

Thus, with the aid of the mentioned acousto-optical filters (AOTFs), one or a plurality of wavelength regions can be selected from the wavelength spectrum of the white light source. An incident light beam, which propagates through the phase grating in the crystal, is then split into its diffraction orders. By varying the frequency $f_0$ of the acoustic wave, the frequency of the phase grating in the acousto-optical crystal changes, and thus also the wavelength $\lambda_0$ of the diffracted light. AOTFs can be implemented in such a way that the centroid wavelengths $\lambda_0$ of the selected wavelength regions exit the acousto-optical crystal colinearly. However, other wavelengths within the selected wavelength regions have a different direction of radiation.

This change in the direction of radiation, respectively the spatial separation between the desired wavelength (in the following, also referred to as target wavelength) $\lambda_0$ and the remaining light that is radiated into the acousto-optical crystal is utilized to separate the light. This is likewise discussed, for example, in the already cited German Patent Application DE 101 15 488 A1 which describes a light source having a white-light laser (including a fiber) and a downstream AOTF.

However, a difficulty encountered when working with the known acousto-optical filters is that, in practice, there is not a unique correlation between an incoupled radio frequency of one acoustic wave and a specific target wavelength. The shape of the transfer function of the AOTF, thus the frequencies, respectively wavelengths of the target light beam which is transmitted through the AOTF given a fixed radio frequency, does not represent an idealized $\delta$ function, but rather corresponds approximately to the following function:

$$T \sim \sin^2(f-f_0)/(f-f_0)^2 \quad (1)$$

This means that the transfer function of an AOTF has numerous secondary maxima, which may be considerably less pronounced than the central principal maximum at the frequency $f_0$, respectively the wavelength $\lambda_0$ of the light, but can have the effect of interfering with the spectroscopy, however.

Thus, for example, light of the target wavelength (principal maximum of the transfer function of the AOTF) is superimposed with light in the region of the secondary maxima since the white light source likewise emits in this spectral region and the AOTF is transmissive in this region. This light later superimposes itself on the actual detection light, for example, after being reflected at the specimen. However, wavelength-selective elements, which are supposed to separate the actual excitation light from the detection light, are often so highly wavelength-selective that they merely separate the actual detection light (for example, fluorescent light of the specimen) from a specific excitation wavelength $\lambda_0$, but do not ensure an adequate separation in the case of excitation light outside of the wavelength $\lambda_0$. This can lead to excitation light reaching the detector which, in turn, seriously degrades the signal-to-noise ratio of the specimen image. Thus, in the case of a fluorescence spectroscopy, the actual fluorescence signals, in particular, can be weaker by orders of magnitude than the excitation light, so that the actual signal is seriously degraded by the excitation light that also reaches the detector.

This difficulty is especially evident when working with microscopes where excitation light and detection light are separated with the aid of acousto-optical beam splitters, AOBS. An AOBS also has a transfer function where the separating action is characterized by a peak maximum in the transfer function. Typically, however, this principal maximum is substantially broader than the maximum of the transfer function of an AOTF, so that one or a plurality of secondary maxima of the transfer function of the AOTF fall within the maximum of the transfer function of the AOBS. This means that the AOBS allows spectral components of the white light source, which reside within the region of these secondary maxima of the transfer function of the AOTF, to reach the detector of the microscope to a large degree.

OBJECT OF THE INVENTION

It is, therefore, an object of the present invention to devise an acousto-optical filter element which will overcome the above described disadvantages of the known acousto-optical filter elements. In particular, it is intended that the acousto-optical filter element be able to efficiently suppress secondary maxima in the transfer function of its transmittance.

SUMMARY OF THE INVENTION

This objective is achieved by an acousto-optical filter element having the features set forth in independent claim 1. Advantageous further refinements of the present invention, which may be realized individually or in combination, are described in the dependent claims.

The present invention is essentially based on the discovery that the above described transfer function of known acousto-optical filter elements is able to be transformed from the frequency domain into a spatial domain through the use of suitable imaging measures. From the described function $\sin^2(f-f_0)/(f-f_0)^2$, a corresponding intensity distribution is obtained by this transformation, in a plane perpendicular to the optical axis of the target light beam, which, for example, follows the function $I(r) \sim \sin^2 r/r^2$ (r being=to the distance from the optical axis). A transformation of this kind from the frequency domain into the spatial domain may be accomplished, for example, by using suitable focusing optical elements, such as a lens and/or a curved mirror, for example. One may also select more complex systems to produce these types of imaging effects. This transformation from the frequency domain into the spatial domain takes place in a focal plane of the lens, respectively of the curved mirror, for example.

This transformation of the AOTF transfer function from the frequency domain into the spatial domain makes it possible for unwanted components to be removed by using appropriate spatial filtering.

Accordingly, an acousto-optical filter element is provided, which has an acousto-optical crystal of the type described above, as well as an acoustic signal transmitter for generating acoustic signals in the acousto-optical crystal. The acousto-optical crystal should be designed (for example, using suitable crystal cuts) to selectively spatially deflect light of a target wavelength from an input light beam entering into the acousto-optical crystal, as a function of a high frequency applied to the acoustic signal transmitter, and to thereby produce, respectively output a target light beam having a desired target wavelength. In this respect, the acousto-optical filter element may correspond to the acousto-optical filter element described in the German Patent Application DE 101 15 488 A1 or to a another one of the acousto-optical filter elements described above.

By applying the above described effect of the transformation from the frequency domain into the spatial domain, the acousto-optical filter element still has at least one spatial filter element that is located in the target light beam, however. This spatial filter element should be designed to selectively suppress the intensity of the target light beam in a plane perpendicular to the propagation direction of the target light beam.

As described above, the spatial filter element may have different designs. In particular, the spatial filter element may include a lens element that optically images the target light beam. In this context, the term "lens element" is to be broadly defined since, as described above, other imaging elements may be used as well, such as (in addition to simple circular or cylindrical lenses) complex lens systems, (for example, objective lenses, also those having a variable focal length), concave mirrors, optical resonators or other image-forming or imaging elements.

In addition, the spatial filter element may include a pinhole. This pinhole may be located at least approximately in a focal plane of the lens element since, there, the described transformation from the frequency domain into the spatial domain is very pronounced. Particularly in Gaussian beam optics, it is desirable that a deviation in the positioning of the pinhole from the focal plane be not more than twice the beam waist of the target light beam. In addition to the pinhole, at least one further pinhole may be optionally provided. In particular, at least one second pinhole may be provided in the aperture of the lens element that functions there as a spatial filter.

In this context, the pinhole may encompass different types of apertures. In particular, square, rectangular, circular or iris apertures may be used, as well as combinations thereof and/or of other apertures. Since the beam deflection produced by the acousto-optical filter element (in the following, also referred to as AOTF) essentially takes place in one plane, it is especially preferred that the pinhole include a slit aperture, thus that it have a narrow aperture slot that preferably extends perpendicularly to the plane defined by the input light beam and the target light beam.

It is especially preferred that the pinhole have an adjustable aperture. In particular, this adjustable aperture may be an electronically adjustable aperture, which, for example, is readily technically implemented in the case of slit apertures and/or iris apertures. In this case, the transfer function of the AOTF according to the present invention may be electronically influenced in a preferred manner, so that, for example, an electronic calibration and/or an electronic control are feasible. For example, the aperture width may be adjusted by a stepper motor or a similar actuator.

Instead of a combination of a lens element and a pinhole, other spatial filter elements may also be realized, however. In particular, alternatively or additionally, the spatial filter element may include an optical waveguide and a lens element configured between one end (incoupling end) of the optical waveguide and the acousto-optical crystal. Again, as explained above, the term "lens element" is to be broadly defined and may encompass different types of image-forming systems. The lens element should be adapted to allow a portion of the target light beam to be coupled into the end of the optical waveguide. In this case, the limited opening of the optical waveguide, which is preferably a single mode fiber, cuts off unwanted side modes of the spatial transfer function. The fiber end should again be preferably situated at least approximately in the focus of the lens. To a significant extent, the numerical aperture of the lens then determines the width of the transfer function in the focal plane of the lens, i.e., in the fiber end region. In addition to the lens, another pinhole element may be provided which further limits the numerical aperture of the lens. The numerical aperture and the pinhole dimensions, respectively the diameter of the optical waveguide core are mutually coordinated in such a way that only the desired width of the wavelength region passes through the pinhole, respectively is coupled into the fiber. The numerical aperture of the lens, and the pinhole, respectively the fiber are preferably selected in such a way that the secondary maxima of the transfer function are blocked by the pinhole and, accordingly, are not coupled into the fiber. In the case that an optical waveguide and a lens element are used, it is especially preferred when the distance and/or the orientation of the lens element relative to the end of the optical waveguide are/is adjustable, preferably electronically (for example, using appropriate servomotors). For example, the lens may be conceived as a varifocal optics. In addition, the varifocal optics may also be provided with a motor and be driven and controlled by software, for example.

The spatial filter element may be adjusted, in particular, in such a way that secondary maxima of an order higher than 2, preferably already secondary maxima of the 1st order are suppressed. This suppression may be accomplished in such a way that these secondary maxima are completely blocked. In this case, merely the principal maximum of the spatial intensity distribution of the target light beam and thus also the principal maximum of the frequency distribution of the transfer function are transmitted. Stricter limitations are also possible, whereby, for example, the spatial filter element is narrowly adjusted to such an extent that outer subregions of the principal maximum are already blocked. The acousto-optical filter element may be designed, in particular, to also include an electronic control. This electronic control may be used to control the spatial filter element, i.e., to influence the transfer function of the acousto-optical filter element. To this end, the electronic control may be designed to act on the above mentioned elements that influence the transfer function. In particular, the electronic control may be designed to adjust a lens focus, a lens focal length, a pinhole width, a distance between the lens and the pinhole, a distance between the lens and the fiber, or other spatial orientations.

In addition, the electronic control may also be designed to adjust the target wavelength, for example, by setting the high frequency applied to the acoustic signal transmitter. Accordingly, the electronic control may include, for example, one or a plurality of electronic components and/or one or a plurality of processors, for example, a microprocessor. Moreover, other elements may be provided, such as input and output elements, data memories, etc. An interface for communicating with another computer may also be provided. In addition, the electronic control may also include an electronic memory (for example, a volatile or non-volatile memory) in which a curve function of the spatial intensity distribution of the target light beam is stored. In this manner, for example, a pinhole may be selectively adjusted to a desired aperture width, for instance, when specific secondary maxima are to be selectively suppressed.

In addition, the acousto-optical filter element may include a calibration device to rapidly and conveniently record the transfer function of the acousto-optical filter element, and to adjust the acousto-optical filter element accordingly. Thus, the calibration device may include a tunable, coherent test light source, for example, whose light beam may be coupled as an input light beam into the acousto-optical filter element, respectively the acousto-optical crystal. In addition, the calibration device may include a detector which is designed to measure an intensity of the target light beam.

The described calibration device may be used to record various transfer functions: On the one hand, given a fixed high frequency of the acoustic signal transmitter, the wavelength of the test light source may be varied (for example, continuously tuned over a predefined wavelength region), the intensity of the target light beam being measured. Alternatively or additionally, given a fixed wavelength of the test light source, the high frequency of the acoustic signal transmitter may also be varied, it being possible for the intensity of the target light beam to be measured. In this manner, the above described $\sin^2 x/x^2$ function may be recorded and the width of the maxima of this transfer function ascertained, for example, in accordance with one or both of the described methods. Accordingly, the spatial filter element may then be adjusted to a desired width.

This calibration may take place, for example, during or after an assembly at the factory, or the calibration may also be part of a routine inspection or adjustment of a system (for example, of a microscope; see below). Various possible uses of a calibration device of this kind are conceivable.

The described acousto-optical filter element in one of the illustrated specific embodiments offers numerous advantages over conventional acousto-optical filter elements. Thus, in particular, the spectral transfer function may be selectively influenced, which has an especially positive effect on the laser spectroscopy and the laser microscopy. The acousto-optical filter element may be used to efficiently suppress excitation light and, in this manner, to substantially improve the signal-to-noise ratio.

Besides the acousto-optical filter element in one of the above described specific embodiments, an adjustable light source is also provided that includes an acousto-optical filter element in one of the described variants. In addition, the adjustable light source includes a broadband coherent light source which is designed and configured to produce the input light beam for the acousto-optical filter element. Instead of one single acousto-optical filter element, a plurality of acousto-optical filter elements may also be provided. The light source may preferably be designed in such a way that the mentioned components of the adjustable light source and, optionally, other components are configured in one common housing. Alternatively, the broadband coherent light source may also be located outside of and disposed spatially separately from the acousto-optical filter element and be connected to the same via a beam path and/or an optical waveguide. For example, an optical waveguide may again be used for this purpose.

In this context, a "broadband" coherent light source is understood, in particular, to be a light source that emits light in a spectral region that resides within the ultraviolet and/or visible and/or infrared spectral region, the width of the emitted spectrum preferably being greater than 10 nm, in particular greater than 100 nm.

The broadband coherent light source may include one or a plurality of light sources. In particular, it may include a broadband laser, especially a white-light laser. For this purpose, a plurality of laser light sources may be superposed, for example, in particular using a suitable device for superposing the beams of the laser light sources (for example, of one or a plurality of beam splitters). Moreover, alternatively or additionally, the broadband coherent light source may also include an optical waveguide having a spectrally broadening doping and a corresponding pump laser, the doping encompassing, in particular, a rare-earth doping, in particular, a doping with ErNd, Yb, Ho and/or a semiconductor doping, in particular, a germanium doping. These types of doped optical waveguides or fibers are generally known to one skilled in the art and are already commercially available to some degree. Alternatively or additionally, a spectrally broadening optical waveguide may also be used that has a corresponding structure. In particular, it may be a question of an optical waveguide, which includes a tapered fiber, a microstructured fiber, a photonic crystal fiber, a holey fiber, a photonic bandgap fiber or a similar fiber. For fiber light sources of this kind, reference may be made to German Patent Applications DE 101 15 488 A1, DE 101 15 509 A1, DE 101 15 589 A1 or to other publications. In this respect, there is no need to discuss in further detail the design of such structured optical waveguides that are used for producing a broadband spectrum.

The adjustable light source in one of the described forms may be advantageously used in different fields of the natural sciences, of engineering or medicine. Here as well, the described advantageous aspects of the acousto-optical filter element are clearly evident. Thus, the adjustable light source may be profitably used, in particular, in the field of spectroscopy. Another application, which is a main focus of the present invention, is the use in a microscope to capture image information from a specimen. It may be a question of a biological specimen, for example, a tissue section of a human, animal or plant tissue. However, other types of specimen may also be used, for example, specimen from the fields of material science or other types of specimen.

Accordingly, the described microscope includes a beam optics and an adjustable light source in one of the described specific embodiments. The microscope may be designed as an ordinary light microscope, for example, however, the design as a scanning microscope being preferred. In particular, this scanning microscope may be a point scanning microscope, with particular preference being given to a line scanning microscope. In this context, the confocal microscope design is especially preferred due to the high resolution.

The adjustable light source may be used in the microscope, alone or in combination with other light sources, to produce excitation light. In this context, depending on the microscope design, the term "excitation light" is not to be merely understood as the specimen being excited by the adjustable light source, respectively by the light beam emitted by this adjustable light source, in the sense of a luminescence or phosphorescence. Other types of interactions with the specimen are also conceivable, and the described arrangement encompasses an arrangement whereby the detection light includes excitation light that is transmitted by and/or reflected from the specimen.

To separate excitation light and detection light, in one preferred embodiment, the microscope features a beam splitter having a beam-splitter transfer function. This means that the separation, respectively the beam-splitter efficiency in separating detection and excitation light, is dependent upon the wavelength. For example, an acousto-optical element, which, in this case, is also referred to as an acousto-optical beam splitter, may be used, in turn, as a beam splitter. In particular, an acousto-optical filter element may also be used as a component of an acousto-optical beam splitter of this kind.

It is preferred in this case that, by adjusting the spatial filter element, the transfer function of the acousto-optical filter element of the adjustable light source, which is used in the microscope, be implemented in such a way that the spectral width of the target light beam, which is produced by the adjustable light source, is smaller than the spectral width of the principal maximum of the beam-splitter transfer function. For example, in particular, when an acousto-optical beam splitter element is used, it again may have a $\sin^2 x/x^2$ function as a transfer function, in this case, the spectral width of the target light beam preferably being selected to be smaller than the spectral width of the principal maximum of the beam-splitter transfer function, preferably maximally as wide as half of the spectral width of the principal maximum of the beam-splitter transfer function.

In addition to a use in the microscope, an acousto-optical beam splitter, which includes an acousto-optical filter element in one of the variants described above, may also be used separately, independently of the microscope. For example, besides a use in microscopy, a use is also possible in other fields, for example, in the field of laser spectroscopy. The advantages of an acousto-optical beam splitter of this kind, having a modifiable transfer function due to the use of a spatial filter, are identical to the advantages described above, and, in this manner, it is possible to produce an acousto-optical beam splitter that has a transfer function having a narrow principal maximum and few or even no secondary maxima.

DETAILED DESCRIPTION

Other details and features of the present invention are derived from the following description of preferred exemplary embodiments in conjunction with the dependent claims. In this connection, the particular features may be realized by themselves alone or in a combination of several of the same with one another. The present invention is not limited to the exemplary embodiments. The exemplary embodiments are schematically illustrated in the figures. In this context, in the individual figures, the same reference numerals denote like or functionally equivalent elements or elements that correspond to one another in terms of the functions thereof.

In the drawing:

FIG. 4b is a detailed representation of region A in FIG. 4a;

FIG. 5b is a detailed representation of region B in FIG. 5a;

Figure 1:
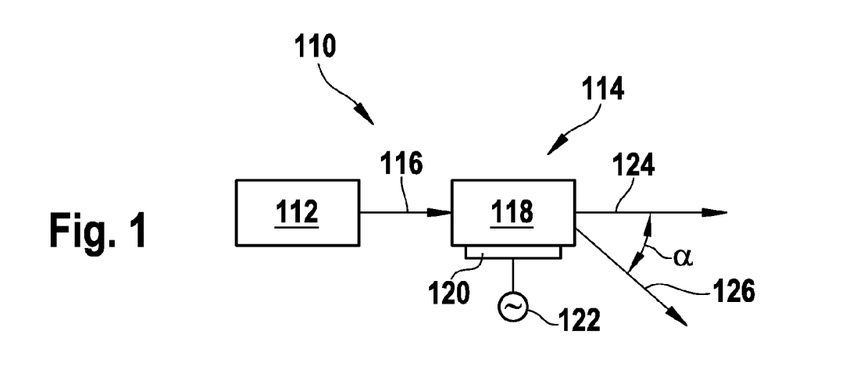
FIG. 1 shows an exemplary embodiment of a conventional light source having an acousto-optical filter element.

An exemplary embodiment of an adjustable light source 110 that corresponds to the related art, is schematically shown in FIG. 1. In this context, it may be a question of an adjustable light source 110 in accordance with the exemplary embodiment described in the German Patent Application DE 101 15 488 A1. Adjustable light source 110 includes a broadband coherent light source 112 and an acousto-optical filter element 114.

Broadband coherent light source 112 may be a white-light laser, for example, or another one of the above-described broadband light sources for producing a broadband coherent radiation spectrum, such as a pumped fiber laser, for example. In this context, reference may be made to the possibilities described above.

Broadband coherent light source 112 produces an input light beam which is symbolically denoted in FIG. 1 by reference numeral 116. This input light beam 116, which encompasses a broad spectrum of electromagnetic radiation, is coupled into acousto-optical filter element 114.

Acousto-optical filter element 114 includes an acousto-optical crystal 118, which may contain tellurium dioxide ($TeO_2$), for example, in an appropriate section cut. To optimally couple input light beam 116 into acousto-optical crystal 118, other elements may be provided in adjustable light source 110, for example, elements which adapt the polarization direction of coherent input light beam 116 to the orientation of acousto-optical crystal 118 (for example, half-wave plates or similar elements).

In addition, acousto-optical filter element 114 includes an acoustic signal transmitter 120, which is also often referred to as a transducer. As described above, this acoustic signal transmitter 120 may include two or more electrodes and a piezoelectric element connected therebetween, and it is coupled to a high-frequency source 122. This high-frequency source 122 is able to apply electrical signals within the range of between a few kHz to a few hundred MHz to acoustical signal transmitter 120 where they are converted into acoustic signals which, in turn, are coupled into acousto-optical crystal 118 in order to produce the acoustic waves described above.

Acousto-optical filter element 114 is designed in such a way that input light beam 116 is split into two light beams on the output side: a transmission light beam 124, which essentially propagates colinearly with input light beam 116 and which, for example, may be blocked by a blocker or may be further utilized. In addition, a target light beam 126, which has precisely the desired wavelength that is to be separated off from input light beam 116, exits acousto-optical crystal 118 on the output side. An angular offset, denoted by a in FIG. 1, between transmission light beam 124 and target light beam 126 renders possible such a separation of light beams 124 and 126. Thus, target light beam 126 may be applied to a specific use, for example, a use in microscopy, light microscopy and/or (confocal) laser scanning microscopy.

Figure 2:
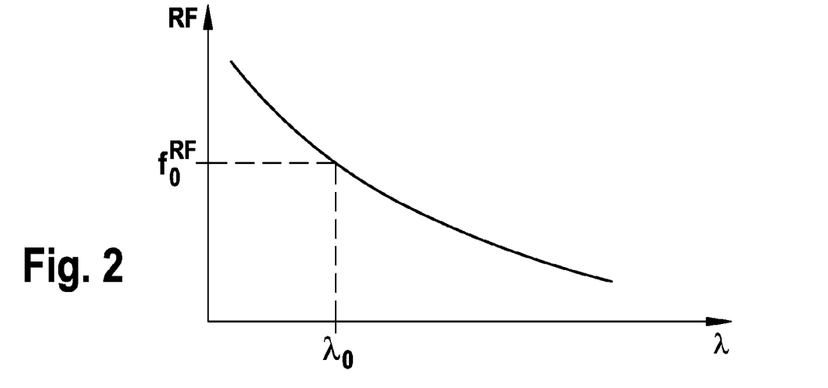
FIG. 2 shows an idealized transfer function of a conventional acousto-optical filter element.

FIG. 2 schematically illustrates a relationship between the incoupled high frequency (denoted there by RF) and wavelength $\lambda$ of target light beam 126 in FIG. 1. It is discernible that (at least within a specific wavelength region) there is a one-to-one relationship between the incoupled high frequency of high-frequency source 122 and wavelength $\lambda$. In this idealized representation, at a specific excitation frequency $f_0^{RF}$, exactly one wavelength $\lambda_0$, $f_0$ is couplable as target light beam 126 out of input light beam 116.

In the case of the idealized relationship between the incoupled acoustic high frequency and target wavelength $\lambda_0$ (respectively, target frequency $f_0$) of target light beam 126, as illustrated in FIG. 2, a frequency scan of input light beam 116 should yield a $\delta$-function which, at a fixed high frequency $f_0^{RF}$, has a sharp peak in target wavelength $\lambda_0$, respectively target frequency $f_0$ in the intensity of target light beam 126. This could be tested (see below), for example, by using a narrowband, tunable coherent light source instead of the broadband coherent light source 112 as a light source for producing input light beam 116. Dye lasers or specific solid-state lasers, which, instead of broadband light, produce monochromatic light of a fixed, tunable wavelength, are mentioned here as examples of these types of light sources. By measuring the intensity of target light beam 126, a transmission curve, respectively a transfer function could be measured in this manner.

Figure 3:
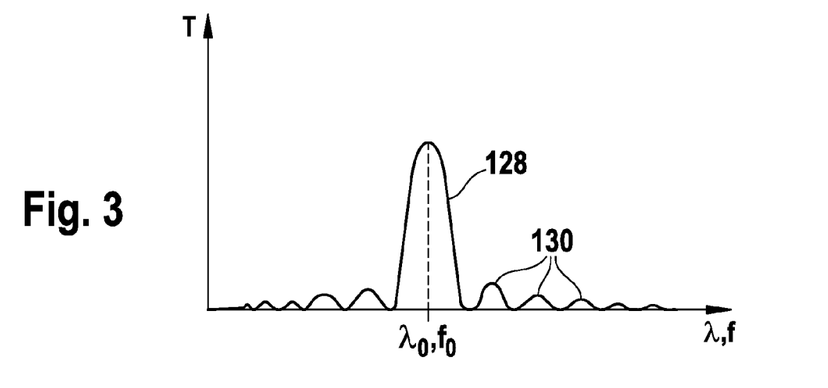
FIG. 3 shows an actual transfer function of a conventional acousto-optical filter element, given a fixed high frequency.

FIG. 3 shows a still idealized, but more realistic transmission spectrum of target light beam 126 in the context of such a tuning of input light beam 116. Transmission T is plotted as a function of wavelength λ of an incoupled, monochromatic, coherent input light beam 116.

It is clearly discernible that, instead of the expected Dirac δ-function in the transfer function, a principal maximum 128 and a plurality of secondary maxima 130 appear. The secondary maxima are typically termed secondary maxima of the 1st, 2nd order, etc., depending on their distance to principal maximum 128. Generally, transfer function T(λ), respectively T(f) represents a curve of a $\sin^2 x/x^2$ function, which may also be theoretically justified. Measured exemplary embodiments of transmission curves of acousto-optical elements (in this case, of acousto-optical beam splitter elements, for which similar transfer functions are obtained) are also described, for example, in the European Patent Application EP 1 281 997 A2.

When a monochromatic light source is used to produce input light beam 116, the transfer function illustrated in FIG. 3 typically does not present any difficulty. This transfer function is problematic, however, when, as illustrated in FIG. 1, acousto-optical filter element 114 is used in an adjustable light source 110 having a broadband coherent light source 112. In this case, the spectrum of input light beam 116 also typically includes portions in the region of secondary maxima 130, which, therefore, after passing through acousto-optical filter element 114, likewise form a component of target light beam 126. For various applications, particularly in the field of laser spectroscopy and/or microscopy, this presents a significant problem, since these unwanted spectral portions of target light beam 126, for example, may excite unwanted atomic or molecular transitions or, as described above and explained in greater detail below, may superimpose themselves on the detection light in a detector and thereby considerably degrade the signal quality.

Therefore, FIG. 4a through 6 show exemplary embodiments of adjustable light sources 110 that are improved in accordance with the present invention and that include an acousto-optical filter element 114 in accordance with the present invention.

Figure 4A:
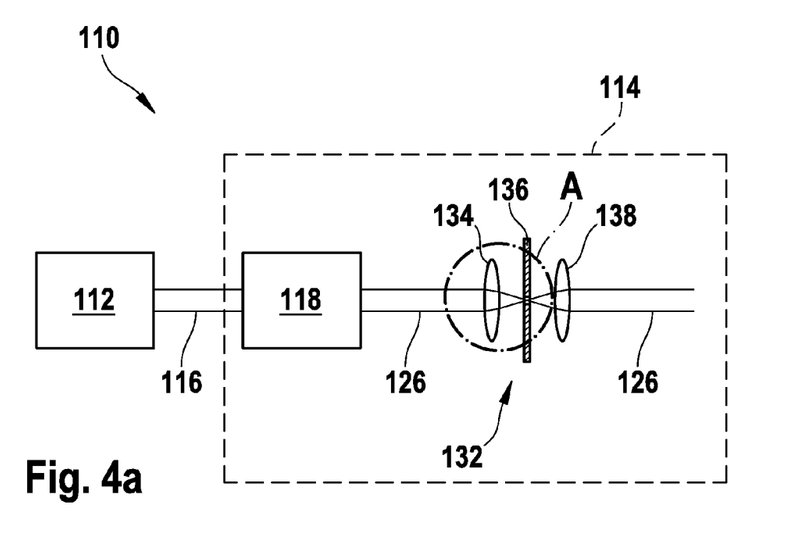
FIG. 4a shows an exemplary embodiment of a light source according to the present invention having an acousto-optical filter element and a spatial filter.
Figure 5A:
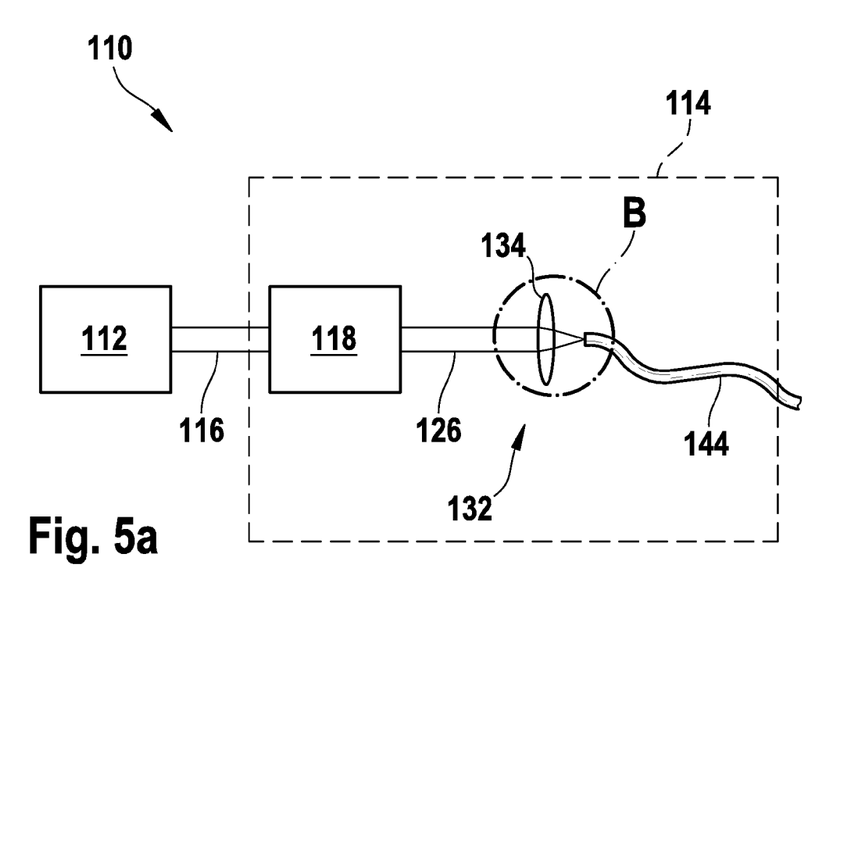
FIG. 5a shows a second exemplary embodiment of a light source according to the present invention having an optical fiber.
Figure 6:
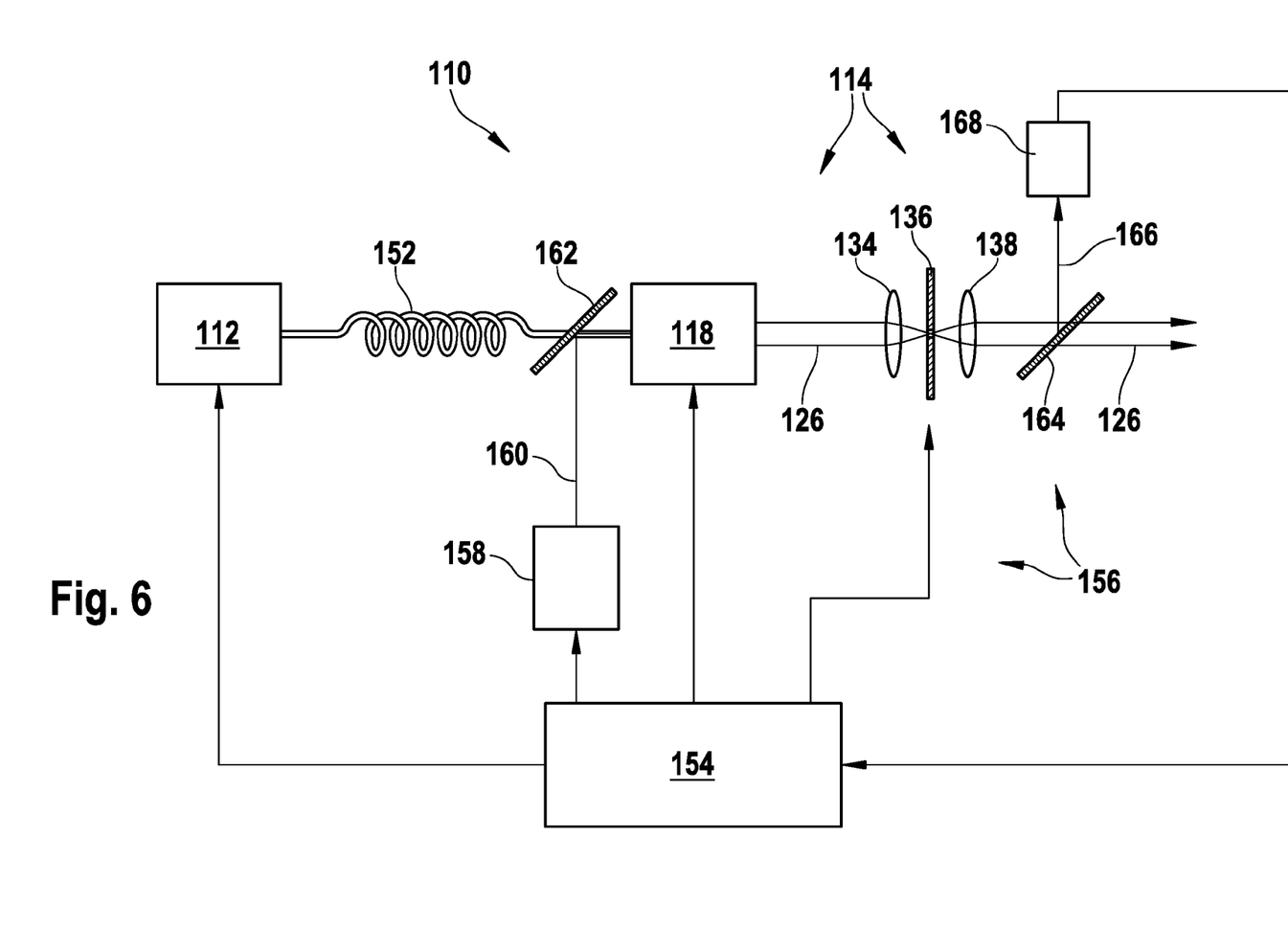
FIG. 6 shows a third exemplary embodiment of an adjustable light source having an electronic control and a calibration device.

In all instances, adjustable light sources 110 again each include a broadband coherent light source 112, so that reference may be made to the above description. In each instance, this broadband coherent light source 112 produces an input light beam 116 having a broad electromagnetic spectrum. This input light beam 116 is coupled into acousto-optical filter element 114.

Acousto-optical filter element 114 again includes an acousto-optical crystal 118. Not shown in the exemplary embodiments is acoustic signal transmitter 120, which is again provided and which, in turn, allows acoustic signals to be coupled into acousto-optical crystal 118.

The combination of acousto-optical crystal 118 with the incoupling of an acoustic wave again permits the separation of a target light beam 126, analogously to the representation in FIG. 1. For the sake of simplicity, other light components, in particular transmission light beam 124, that have been separated off from target light beam 126, are not shown in FIG. 4a through 6 since they may be directly blocked, for example.

In this respect, the design illustrated in FIG. 4a through 6 essentially corresponds to the design in accordance with FIG. 1 and basically has the same transfer function.

However, to "clean up" the transfer function illustrated in FIG. 3, a spatial filter element 132 is provided in accordance with the present invention. This spatial filter element 132 is based on the realization that the transfer function illustrated in FIG. 3 in the frequency domain, respectively wavelength domain is able to be transformed into a spatial transfer function by employing suitable imaging measures. A transformation of this kind from the frequency domain into the spatial domain, for example, a Fourier transformation, is known from various other fields of optics, for example, from the field of holography.

Figure 4B:
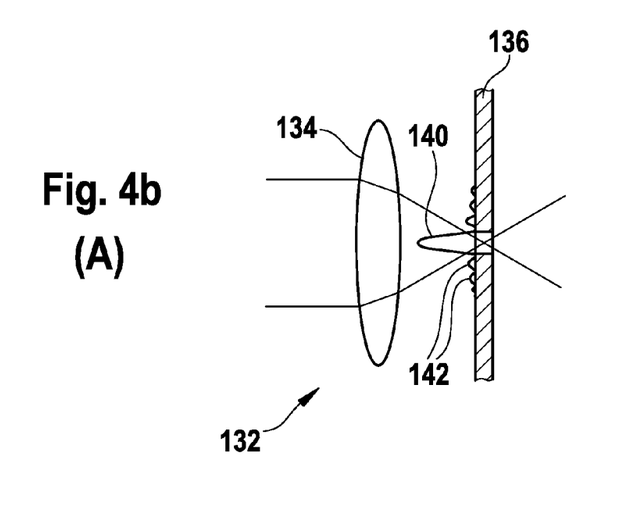

FIG. 4a shows a first exemplary embodiment, FIG. 4b showing a detailed representation of region A in FIG. 4a. In the case of the design in FIGS. 4a and 4b, for purposes of the transformation, spatial filter element 132 includes a first lens element 134 which is located in the beam path of target light beam 126 downstream of the output of acousto-optical crystal 118. This first lens element 134, which, in place of one single lens, may also include a combination of a plurality of lenses, focuses target light beam 126. A pinhole 136 is located in the focal plane of first lens element 134. This pinhole 136 may be a rectangular aperture or slit aperture, for example, which preferably has an adjustable aperture width. Downstream of pinhole 136 in the beam path is a second lens element 138, which again collimates the now "cleaned-up" target light beam 126 for a further use.

Spatial region A (FIG. 4a), respectively B (FIG. 5a) around pinhole 136 is shown in FIG. 4b, respectively FIG. 5b, again, in each case, in an enlarged detailed representation. In this context, it is discernible, as described above, that the transfer function, which is illustrated in FIG. 3 in the frequency domain, has now been transformed into a spatial transfer function having a spatial principal maximum 140 and a plurality of spatial secondary maxima 142. Pinhole 136 is adjusted in its aperture width in such a way that, of the illustrated transfer function, it preferably essentially transmits spatial principal maximum 140, whereas secondary maxima 142 are essentially cut off. Other embodiments are also possible, such as an embodiment whereby the aperture width of pinhole 136 is selected to allow the first secondary maxima 142 to also be transmitted, or an embodiment whereby the aperture width is selected to be so narrow that not only are secondary maxima 142 cut off, but also an outer portion of spatial principal maximum 140. Replacing pinhole 136 with a screen, for example, makes it possible for the spatial intensity distribution, which likewise corresponds to a $\sin^2 x/x^2$ function, to also be directly observed with the naked eye or by using a magnifying device in order to then be able to adjust the pinhole width accordingly.

Adjustable light source 110 illustrated in FIG. 4a may be used, in particular, in microscopy, light microscopy and (confocal) laser scanning microscopy. With the aid of acousto-optical filter element 114, the power and the wavelength of the selected wavelength band of target light beam 126 may be varied (also simultaneously). The design of acousto-optical filter element 114 may be integrated in a housing (not shown in the figures), thus allowing it to be marketed as a self-contained unit. In particular, acousto-optical filter element 114 may also be integrated in a housing (likewise not shown) of adjustable light source 110 and/or in a housing of a microscope.

The width of the selected wavelength region may be varied by varying the aperture width of pinhole 136. Alternatively or additionally, lens 134 may also be conceived as a varifocal optics. Variable pinhole 136, respectively the varifocal optics may also be provided with a motor and be driven or controlled by software, for example. In particular, it may be expedient for the width of the selected wavelength region to be adjusted as a function of elements disposed downstream of a transfer function (see below).

FIG. 5a shows an adjustable light source 110 in accordance with the present invention that has been slightly modified in comparison to FIG. 4a and that again encompasses a lens element 134 in the beam path of target light beam 126, downstream of acousto-optical crystal 118. However, in place of or in addition to a pinhole 136, this exemplary embodiment provides for an optical waveguide 144 that is preferably a single mode fiber. In cooperation with lens element 134, it functions here as a spatial filter element 132.

Figure 5B:
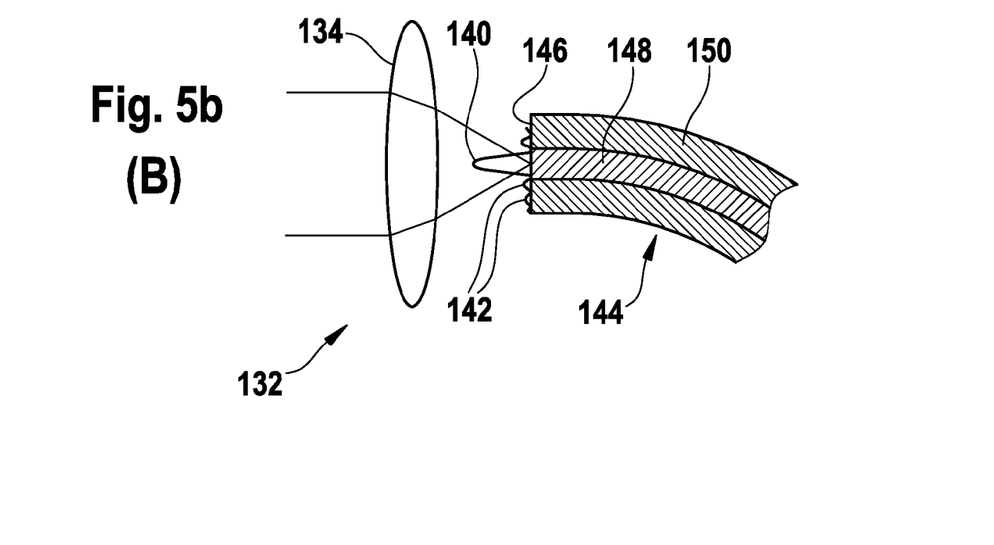

A detailed representation of region B of spatial filter element 132 is again shown in an enlarged view in FIG. 5b. It is discernible in this context that the spatial intensity distribution again occurs in the focal plane of optical waveguide 144. Fiber end 146 is preferably positioned in the focal plane of lens element 134. The fiber, respectively optical waveguide 144 has a structure that includes a fiber core 148 and a fiber cladding 150. Since the incoupling must essentially take place into fiber core 148, the opening width of fiber core 148 in this exemplary embodiment functions similarly to the aperture of pinhole 136 in the example in accordance with FIGS. 4a and 4b. Thus, fiber end 146 acts together with lens 134 as a spatial filter element 132.

In this case, the width of the selected wavelength region may be adjusted by changing the distance between lens 134 and fiber end 146 to a certain degree. However, it is preferred when lens element 134, as described above, is conceived as a varifocal optics, i.e., as a lens element 134 having a variable focal length that is preferably electronically adjustable (for example, by a motor). Again, a control is useful, for example, using appropriate software, as well as a suitable monitoring of this control.

FIG. 6 shows a third exemplary embodiment of an adjustable light source 110 according to the present invention. The design of light source 110 according to the present invention essentially corresponds to that of the exemplary embodiment in FIG. 4a, so that reference may be made to a large degree to the description of this figure. A slight difference resides in the fact that, in this case, broadband coherent light source 112 is connected to acousto-optical filter element 114 via an optical waveguide in the form of a fiber 152.

In addition, in the exemplary embodiment illustrated in FIG. 6, acousto-optical filter element 114 includes an electronic control 154. At the same time, this electronic control 154 may also be designed as an electronic control for broadband coherent light source 112. In particular, it may include a microprocessor, input and output means (such as, for example, a suitable interface to allow connection to other computer systems and/or electronic components), as well as other electronic components for the control. In particular, as explained above, an electronic memory (for example, a volatile and/or non-volatile memory) may also be provided in the electronic control, in which, for example, one or a plurality of curve shapes of the transmission functions in accordance with FIG. 3 and/or of the spatial transfer function in accordance with detail A, respectively B in FIG. 4a, respectively 5a may be stored. Accordingly, the aperture width of pinhole 136 and/or a focal length of lens 134 may then be electronically adjusted when a specific filtering is desired. This may be accomplished, for example, by a user at a screen display, who, for example, by setting corresponding markings on the screen display is able to adjust the width of the transfer function.

In addition, in the exemplary embodiment in accordance with FIG. 6, acousto-optical filter element 114 includes a calibration device 156. This device includes a coherent, tunable test light source 158 (for example, one of the tunable lasers described above) to produce a coherent, narrow-band test light beam 160, a beam splitter 162 for coupling the test light beam into acousto-optical crystal 118, a second beam splitter 164 for outcoupling a detection beam 166, and a detector 168 for detecting detection beam 166. Accordingly, control 154 may be designed to determine a transfer function of acousto-optical filter element 114 during a calibration process. Accordingly, given a fixed, predefined high frequency of acoustic signal transmitter 120, test light source 158 may, for example, be tuned over a specific wavelength region, an intensity of target light beam 126 being measured by detector 168. In this manner, a function in accordance with FIG. 3, for example, may be measured. Accordingly, a width of pinhole 136 may then be adjusted, for example, likewise by electronic control 154, in order to influence this transfer function.

Alternatively or additionally, given a fixed wavelength of test light source 158, the incoupled high frequencies may also be varied, the intensity of target light beam 126 being measured. In this manner, adjustable light source 110 in accordance with the exemplary embodiment in FIG. 6 permits a rapid calibration and adjustment of the transfer function of acousto-optical filter element 114, which may be readily adapted to the other components of the overall system in which adjustable light source 110 is used.

Figure 7:
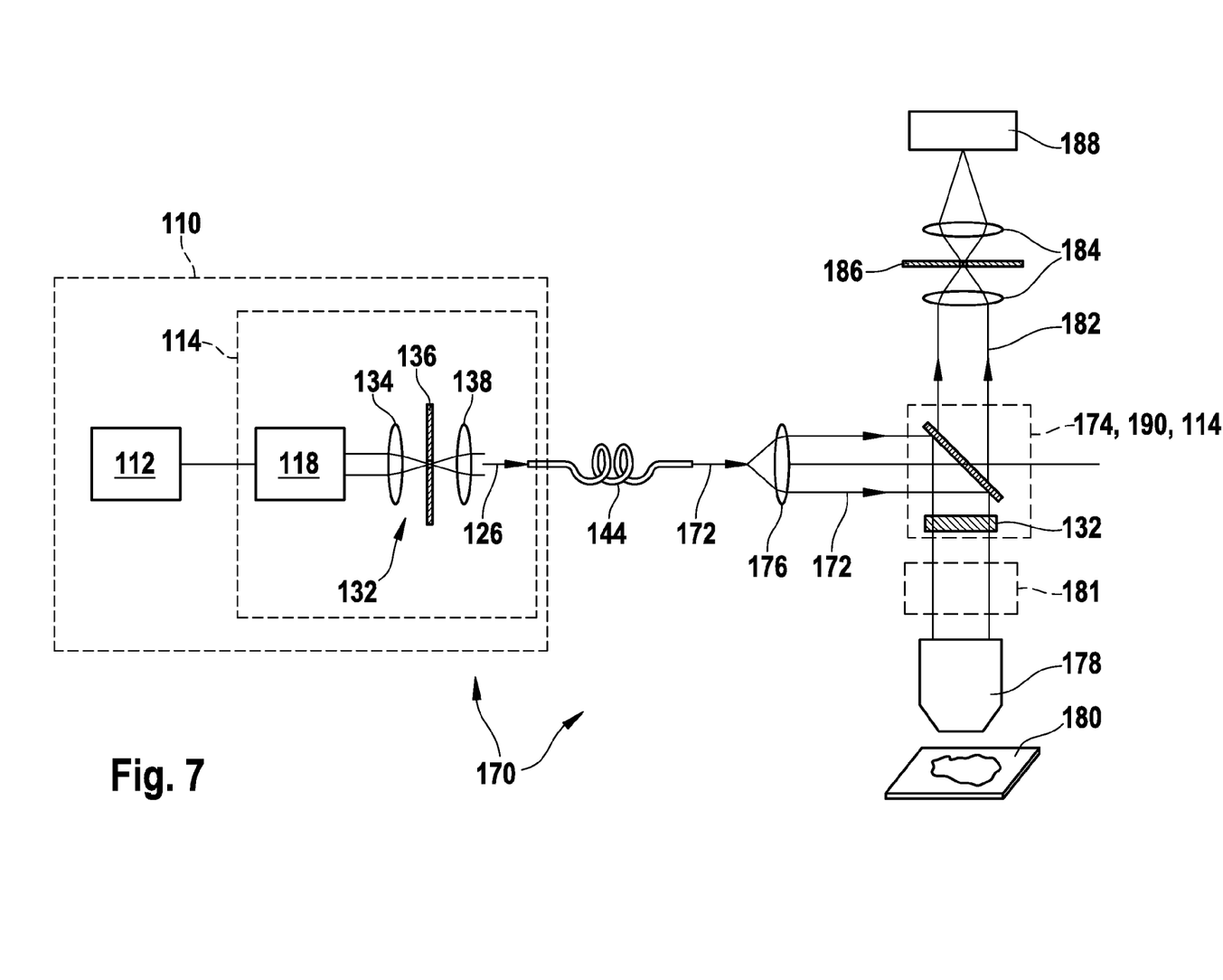
FIG. 7 shows an exemplary embodiment of a confocal microscope according to the present invention having an adjustable light source according to the present invention and a beam splitter element.

FIG. 7 depicts one possible system within which an adjustable light source 110 in accordance with the present invention, respectively an acousto-optical filter element 114 in accordance with the present invention may be used. In the present case, this system is conceived as microscope 170. In the specific embodiment illustrated here, microscope 170 is a confocal laser scanning microscope; as described above, other specific embodiments also being possible, however, within which the present invention may be implemented.

To begin with, microscope 170 includes an adjustable light source 110 in accordance with the exemplary embodiment in FIG. 4a. Target light beam 126 produced by this light source 110 is coupled into an optical waveguide 144 and directed as excitation light 172 via a beam-shaping optics 176 (merely hinted at in FIG. 7) to a beam splitter element 174.

Thus, the exemplary embodiment shown in FIG. 7 combines the techniques of the exemplary embodiments of FIGS. 4a and 5a. On the one hand, spatial filter element 132 features two lens elements 134, 138 having a pinhole 136 disposed therebetween; on the other hand, an optical waveguide 144 is used. Alternatively, it is self-evident that a "pure form" of the variants of spatial filter element 132 in accordance with one of the examples of FIG. 4a or 5a may be used.

In microscope 170, excitation light 172 is directed by beam splitter element 174 via an optical system 178 to a specimen 180. In this context, in the exemplary embodiment illustrated in FIG. 7, a scanning device 181 is used to scan specimen 180 using excitation light 172, for example, point-by-point (point scanning device) or line-by-line (line scanning device). For example, scanning device 181 may include one or a plurality of galvanometer mirrors.

Detection light 182 thereby emitted by specimen 180 (for example, in a fluorescence process) is transmitted through beam splitter element 174 and is thus separated from excitation light 172. Beam splitter element 174 is followed by another lens system 184 having a confocal pinhole 186. This confocal pinhole 186 is an important element of the confocal design of microscope 170 and contributes substantially to improving the resolution of the image quality.

Downstream of lens system 184, microscope 170 includes a detector 188 which detects detection light 182. In addition, microscope 170 includes other components, such as a central control, for example, which may also include electronic control 154 of adjustable light source 110, respectively of acousto-optical filter element 114 (see FIG. 6). These components, which, in turn, may include a computer system, for example, produce a composition of the image of specimen 180 that was acquired on a point-by-point or line-by-line basis.

For conventional microscopes 170, the design of beam splitter element 174, in particular, presents a challenge. For this beam splitter element 174, various elements known from the related art may be used, such as dichroic mirrors, spatially structured beam splitter elements or similar beam splitter elements, for example. In many cases, however, acousto-optical elements are used, in turn, in this beam splitter element 174, so that in the exemplary embodiment illustrated in FIG. 7, for example, beam splitter element 174 may be designed as acousto-optical beam splitter element 190. An example of an acousto-optical beam splitter element of this kind, which, again, is able to separate beams of different wavelengths from one another by an angular offset, which then renders possible the beam splitting, is described in the European Patent Application EP 1 281 997 A2.

However, a difficulty associated with these types of beam splitter elements, such as acousto-optical beam splitter elements 190, in particular, resides again in that they have a transfer function having a characteristic width. To illustrate the advantages of using an adjustable light source 110 in accordance with the present invention, respectively of an acousto-optical filter element 114, reference is made to the representation in FIG. 8. In this representation, typical transfer functions are shown, curve 192 denoting the transfer function of acousto-optical filter element 114 (which essentially corresponds to the transfer function in accordance with FIG. 3), and curve 194 denoting the transfer function of acousto-optical beam splitter element 190.

Figure 8:
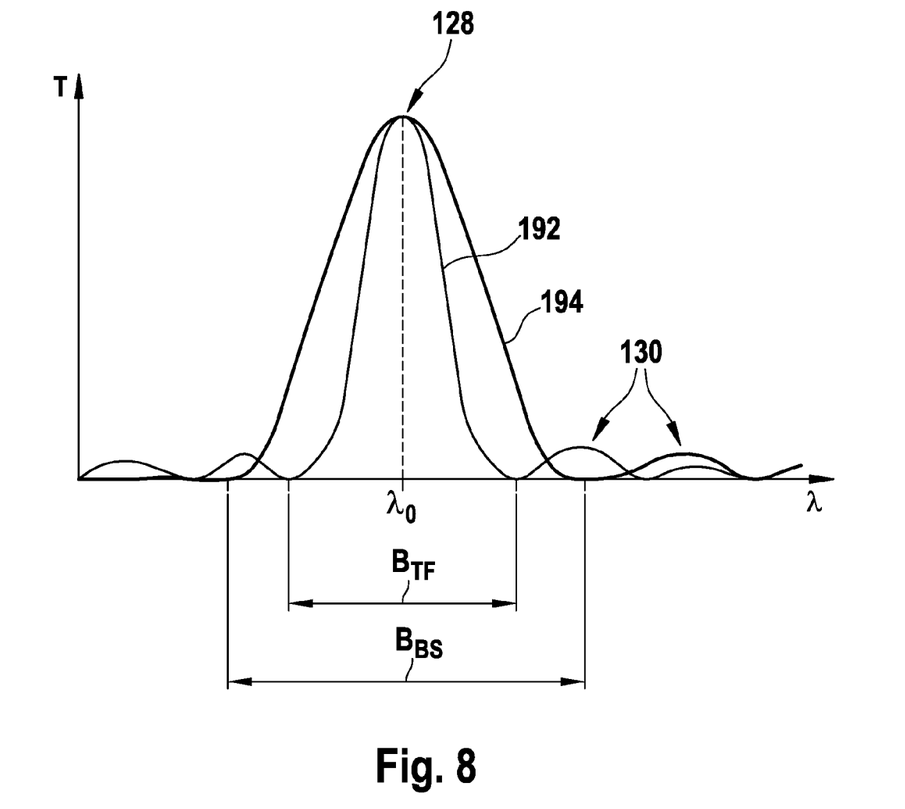
FIG. 8 shows transfer functions of the adjustable light source and of the beam splitter element of the microscope in accordance with FIG. 7.

In this context, it is discernible that transfer function 194 of acousto-optical beam splitter element 190 is substantially wider (denoted by $B_{BS}$ in FIG. 8), whereas transfer function 192 of acousto-optical filter element 114 is considerably narrower (denoted by $B_{TF}$ in FIG. 8). "Width" is understood in each case to be the distance between the first minima around principal maxima 128. Other definitions of "width" would also be possible, such as a half-value width, for example.

It is clearly discernible that secondary maxima 130 of this "uncleaned" [raw] transfer function 192 of acousto-optical filter element 114 reside outside of the principal maximum of transfer function 194 of acousto-optical beam splitter element 190. However, this means that components of excitation light 172, which reach specimen 180 and are reflected by the same, are not deflected again at acousto-optical beam splitter element 190 on the "return path" in the direction of light source 110 and are thus not kept away from detector 188, but rather may reach detector 188, essentially unhindered. In view of the fact that, in many cases, actual detection light 182 is weaker by orders of magnitude than excitation light 172, this poses a serious problem to the detection of actual detection light 182.

However, using acousto-optical filter element 114 shown in FIG. 7, excitation light 172 of adjustable light source 110 is able to be adjusted in a way that allows it to be cut off in the region of the first secondary minima. This means, in particular, that, in the case of the spectrum symbolically illustrated in FIG. 8, merely principal maximum 128 is still contained in excitation light 172. The transfer function of acousto-optical filter element 114 is typically adjusted in such a way that width $B_{TF}$ equals precisely half of width $B_{BS}$, which signifies an effective suppression of the excitation light component in detection light 182. This substantially improves the quality of the image information of specimen 180 captured using microscope 170. In particular, image contrasts and signal-to-noise ratios are able to be optimized, thereby opening up new application possibilities.

Thus, in the exemplary embodiment illustrated in FIG. 7, microscope 170 includes two acousto-optical elements, namely acousto-optical filter element 114 and acousto-optical beam splitter element 190. Alternatively or in addition to the use of a spatial filter element 132 in acousto-optical filter element 114 of adjustable light source 110, an acousto-optical filter element 114 having a spatial filter element 132 may also be used in acousto-optical beam splitter element 190. For this purpose, as indicated schematically in FIG. 7, acousto-optical beam splitter element 190 may also be designed to include a spatial filter element 132, which, in this exemplary embodiment, is additionally introduced in the beam path between acousto-optical beam splitter element 190 and scanning device 181.

The design of acousto-optical beam splitter element 190 may correspond to that described in European Patent Application EP 1 281 997 A2, for example. Thus, it may again include an acousto-optical crystal 118 having an acoustic signal transmitter 120. Downstream of this acousto-optical crystal 118, a spatial filter element may again be used, for example, again a spatial filter element which has lens elements 134, 138 (one single lens element 134 being sufficient), as well as a pinhole 136. In this case, the efficiency of the beam splitting by acousto-optical beam splitter element 190, respectively the transfer function thereof is limited in such a way that merely excitation light 172 within a narrow wavelength region around target wavelength $\lambda_0$ reaches specimen 180, not, however, excitation light 172 having spectral components that are further removed from target wavelength $\lambda_0$, which on the "return path" from specimen 180 would only be insufficiently deflected by acousto-optical beam splitter element 190 and thus kept away from detector 188. In this manner, alternatively or additionally, the idea of using acousto-optical filter element 114 together with spatial filter element 132 may be advantageously applied and utilized to improve the image quality.

LIST OF REFERENCE NUMERALS 110 adjustable light source
112 broadband coherent light source
114 acousto-optical filter element
116 input light beam
118 acousto-optical crystal
120 acoustic signal transmitter
122 high-frequency source
124 transmission light beam
126 target light beam
128 principal maximum
130 secondary maxima
132 spatial filter element
134 first lens element
136 pinhole
138 second lens element
140 spatial principal maximum
142 spatial secondary maxima
144 optical waveguide
146 fiber end
148 fiber core
150 fiber cladding
152 fiber
154 electronic control
156 calibration device 158 test light source
160 test light beam
162 beam splitter
164 beam splitter
166 detection beam
168 detector
170 microscope
172 excitation light
174 beam splitter element
176 beam-shaping optics
178 optical system
180 specimen
181 scanning device
182 detection light
184 lens system
186 confocal pinhole
188 detector
190 acousto-optical beam splitter element
192 transfer function AOTF
194 transfer function AOBS

The invention claimed is:

1. An acousto-optical filter element comprising:
an acousto-optical crystal having an acoustic signal transmitter for generating acoustic signals in the acousto-optical crystal, the acousto-optical crystal configured to selectively spatially deflect light of a target wavelength from an input light beam of a broadband coherent light source entering into the acousto-optical crystal, as a function of a high frequency applied to the acoustic signal transmitter, and to thereby produce a target light beam having a desired target wavelength; and
a spatial filter element located in the target light beam, the spatial filter element configured to selectively suppress the intensity of a portion of the target light beam in a plane perpendicular to the propagation direction of the target light beam, the spatial filter element comprising an optical waveguide and a lens element, an opening of the optical waveguide cutting off unwanted side modes of a spatial transfer function of the target light beam.

2. The acousto-optical filter element as claimed in claim 1, the lens element located between one end of the optical waveguide and the acousto-optical crystal and is adapted to couple a portion of the target light beam into the end of the optical waveguide.

3. The acousto-optical filter element as claimed in claim 2, the optical waveguide including a single mode fiber.

4. The acousto-optical filter element as claimed in claim 2, a distance and/or an orientation of the lens element relative to the end of the optical waveguide being adjustable.

* * * * *